UNITED STATES PATENT OFFICE.

TERENCE SPARHAM, OF BROCKVILLE, ONTARIO, CANADA.

ROOFING COMPOSITION.

SPECIFICATION forming part of Letters Patent No. 229,925, dated July 13, 1880.

Application filed April 14, 1880. (Specimens.) Patented in Canada August 24, 1874.

*To all whom it may concern:*

Be it known that I, TERENCE SPARHAM, of Brockville, in the county of Leeds, Province of Ontario, and Dominion of Canada, physician, have invented a new and useful Roofing Cement or Composition, of which the following is a specification.

My invention relates to a cement or composition adapted to be spread upon the roofs of buildings while in a plastic state, and to become hardened and form a continuous sheet of water and fire proof covering for said roof; and it consists of a roofing cement or composition, as a new article of manufacture, composed of mica, plumbago, and soapstone finely powdered and thoroughly mixed together and with a quantity of coal-tar or other bituminous liquid substance in the proportions and manner hereinafter fully described.

In preparing this cement or roofing composition, I take mica, plumbago, and soapstone, in the proportion of one part of mica, one part of plumbago, and three parts of soapstone, powder them finely, and mix them thoroughly together. To this mixture I add enough coal-tar or other liquid bituminous substance to give the mixture such a consistency that the composition resulting shall be sufficiently plastic to enable it to be readily and easily spread upon the roof or other object to which it is desired to apply it.

Generally the proportion of bituminous liquid required will be about one part of the liquid to two parts of the powdered mixture; but as the consistency of coal-tar varies considerably at different times, I do not wish to confine myself to the precise proportions here given, but claim the right to use such a proportion of the coal-tar or other bituminous liquid, whether more or less than above stated, as will render the composition of the proper consistency to spread easily and not flow after being spread.

The proportions of the powdered materials may also be varied somewhat without materially affecting the useful qualities of the composition for roofing purposes.

This composition may be applied alone to a roof after it has been first covered with the ordinary tarred sheathing-paper, and, when hardened by exposure to the atmosphere and the heat of the sun, a perfectly water-tight and fire-proof covering is the result, which is sufficiently elastic to withstand the action of the extreme changes of temperature and the ordinary slight changes of position of the building occasioned by the action of frost or an imperfect foundation without cracking; or it may be applied in combination with alternate layers of felt with equally good results by first covering the roof-boarding with tarred paper, spreading thereon a thin coating of my composition while in a plastic state, covering this with a layer of felt, and then spreading a second coating of the cement over the whole while in a plastic state, and permitting the whole to dry and harden, as before described.

I do not, however, claim the use of felt or tarred paper for covering roofs. Neither do I lay claim to any special method of applying my composition, except that it should be applied while in a plastic state and be allowed to harden upon the roof where it is to be used.

What I claim as new, and desire to secure by Letters Patent of the United States, is—

A roofing cement or composition composed of mica, plumbago, soapstone, and coal-tar, or other liquid bituminous substance, united in about the proportions herein set forth and described, for the purposes specified.

Executed at Brockville, Ontario, Canada, this 6th day of April, A. D. 1880.

TERENCE SPARHAM.

Witnesses:
WM. SHERWOOD,
*Of the town of Brockville, Ontario, Barrister-at-Law.*
GEO. E. GASCOIGNE, M. D.